United States Patent [19]

Michel

[11] Patent Number: 4,843,237

[45] Date of Patent: Jun. 27, 1989

[54] PHOTOELECTRIC LENGTH AND ANGLE MEASURING DEVICE

[75] Inventor: Dieter Michel, Traunstein, Fed. Rep. of Germany

[73] Assignee: Dr. Johannes Heidenhain GmbH, Traunreut, Fed. Rep. of Germany

[21] Appl. No.: 114,640

[22] Filed: Oct. 28, 1987

[30] Foreign Application Priority Data

Oct. 29, 1986 [DE] Fed. Rep. of Germany ....... 3636744

[51] Int. Cl.$^4$ .............................................. H01J 3/14
[52] U.S. Cl. ........................ 250/237 G; 250/231 SE
[58] Field of Search .................. 356/374; 250/237 G, 250/231 SE; 33/125 C

[56] References Cited

U.S. PATENT DOCUMENTS

| | | | |
|---|---|---|---|
| 3,768,911 | 10/1973 | Erickson | 356/374 |
| 4,091,281 | 5/1978 | Willhelm et al. | 250/237 G |
| 4,614,864 | 9/1986 | Wu | 250/237 G |
| 4,650,332 | 3/1987 | Muraoka et al. | 250/237 G |
| 4,654,523 | 3/1987 | Tanaka et al. | 250/237 G |

*Primary Examiner*—David C. Nelms
*Attorney, Agent, or Firm*—Willian Brinks Olds Hofer Gilson & Lione Ltd.

[57] ABSTRACT

A measuring device for measuring the relative position of two objects includes a graduation of a graduation support connected with one object and a scanning device connected with the other object. The scanning device scans the graduation with light. To eliminate measuring errors that arise due to irregularities in the graduation plane of the graduation support, a first scanning graduation of a first scanning plate is positioned at a first scanning distance from the graduation plane of the graduation support and a second scanning graduation of a second scanning plate is positioned at a second scanning distance from the graduation plane of the graduation support. The scanning graduation plates are located in the scanning unit and intersect light beams from a light source. The graduation planes of the scanning graduation plates are positioned parallel to the graduation plane of the graduation support. A photoelement is optically associated with each of the scanning graduations. The photoelements produce two periodic scanning signals, from which two measuring values are formed in an evaluation device. A true measuring value is determined from these measuring values by means of a computer.

19 Claims, 4 Drawing Sheets

PHOTOELECTRIC LENGTH AND ANGLE MEASURING DEVICE

BACKGROUND OF THE INVENTION

The invention relates to a measuring device and particularly to a photoelectric length or angle measuring device for measuring the relative position of two objects.

Position measuring devices are used, for example, in processing machines for measuring the relative position of a tool and a workpiece. Typically, a scanning unit connected to the tool scans a graduation connected to the workpiece. The signal obtained as a result of scanning is used to determine the relative position of the tool to the workpiece. As an additional example, position measuring devices are used in coordinate measuring machines for determining the position and/or dimensions of test objects.

The dissertation "Three-Lattice Interval Indicators" by Jorg Willhelm, 1978, describes, in Section 2.4.1, an incident light measuring device in which the graduation of a graduation support is scanned by a scanning unit. The scanning unit comprises a light source, a condenser, a scanning plate with a scanning graduation, an objective lens, and a photoelement. The light beams of the light source are directed in parallel from the condenser and traverse the scanning graduation of the scanning plate. The light beams are reflected from the graduation plane of the graduation support, through the scanning graduation and the objective lens, to the photoelement. Two displaceable objects are connected with the graduation support and the scanning unit, respectively. In an evaluating device, measuring values of the relative position of the two displaceable objects are determined from periodic scanning signals produced by the photoelement during the measuring movement. The evaluating device includes a trigger unit and a meter.

Section 4.7 of the dissertation states that flatness errors of the graduation plane of the graduation support, as well as guide errors of the graduation support or the scanning unit, can lead to measurement errors. These measuring errors are especially prominent in interferometric incident light measuring devices because the scanning distances between the graduation plane of the graduation support and the scanning graduation plane of the scanning plate are greater.

SUMMARY OF THE INVENTION

The present invention is directed to an improved position measuring device.

According to a preferred embodiment of this invention, a photoelectric measuring device for measuring the relative position of a first object to a second object comprises a scanning unit connected with one object and a graduation of a graduation support connected with the other object. The scanning unit scans the graduation and includes at least two scanning graduations positioned at different distances from the graduation. A true measuring value can be determined from the measuring values produced by means of the scanning graduations.

One advantage of the invention is the fact that when measuring errors arise, a true measuring value is continuously determined with simple means. Another advantage is that measuring and calibration of such a position measuring device, as well as the use of error correcting tables or error correcting templates can be eliminated. An additional advantage is that particular changes in the position and the amount of measuring errors over the course of time have no influence on the measuring accuracy. A further advantage is that high demands need not be placed on the guides of the objects to be measured or on the flatness of the surfaces on which the measuring device is attached.

The invention itself, together with further objects and attendant advantages, will best be understood by reference to the following detailed description, taken in conjunction with the acoompanying drawings.

BRIEF DESCRIPTION OF THE DRAWINGS:

FIG. 5a is a representation of a first preferred embodiment of the invention in a lateral view;

FIG. 5b is a cross-sectional representation of the preferred embodiment of FIG. 5a;

DETAILED DESCRIPTION OF THE PRESENTLY PREFERRED EMBODIMENTS

Figure 1:
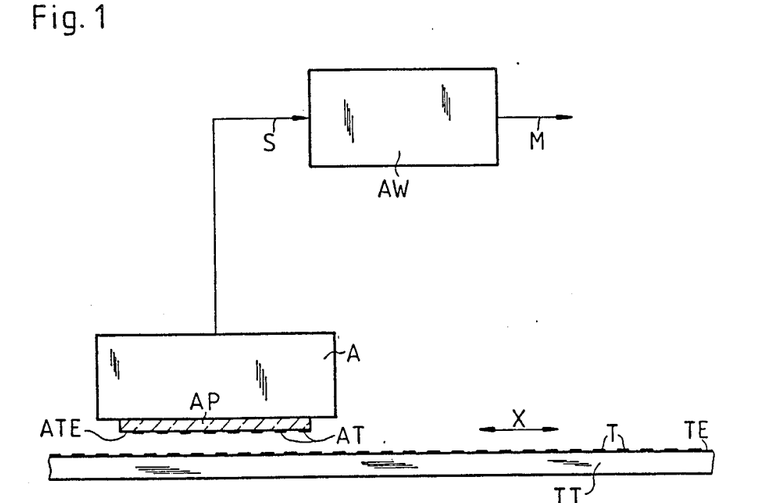
FIG. 1 is a representation of an embodiment of a photoelectric incremental length measuring device in a lateral view.
Figure 2:
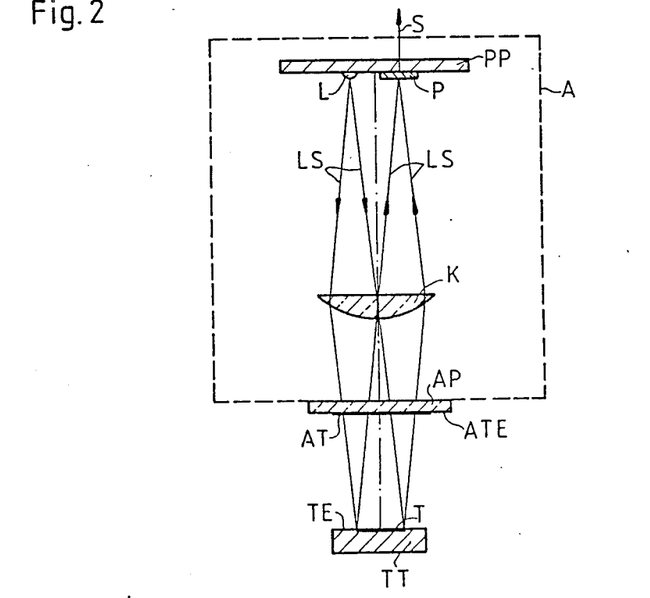
FIG. 2 is an enlarged cross-sectional representation of the device of FIG. 1.

Referring now to the drawings, FIGS. 1 and 2 show an embodiment of a photoelectric incremental length measuring device. An incremental graduation T in a graduation plane TE of a metallic graduation support TT is scanned by light from a non-contacting scanning unit A. The graduation support TT and the scanning unit A are, in a manner not shown, connected with two displaceable objects, whose reciprocal relative position is to be measured. The objects may be formed by a slide unit and the bed of a processing machine.

To scan the graduation T of the graduation support TT, light beams LS emitted by a light source L are, in the scanning unit A, directed in parallel through a condenser K. The beams LS then traverse a transparent scanning plate AP and a scanning graduation plane ATE of the scanning plate AP. The scanning graduation plane ATE includes a scanning graduation AT. The beams LS are reflected from the graduation plane TE, through the scanning graduation AT, to a photoelement P of a photoelement plate PP. The scanning graduation AT is the same type of graduation as the graduation T. During the measuring movement along the measuring axis X the light beams LS are modulated by the graduation T and the scanning graduation AT. During the measuring movement, the photoelement P produces a periodic scanning signal S, which is based on the modulated light beams and is conducted to an evaluating device AW. The evaluating device includes a pulse-shaper stage and a counter. The measuring value for the reciprocal relative position of the displaceable objects can be conducted, in a manner not shown, to an indicator unit or to the control unit of a processing machine.

Figure 3:
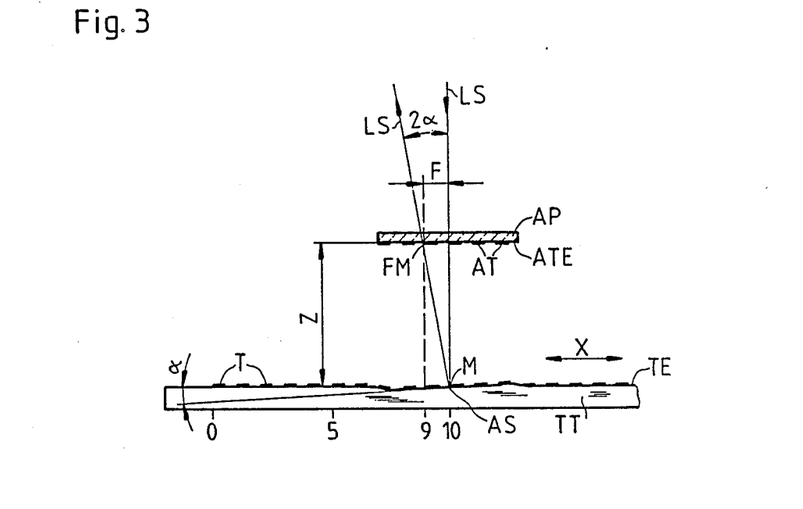
FIG. 3 is a first diagram of a light beam path.

FIG. 3 shows a first schematic light beam path in a length measuring device. The graduation plane TE has an irregularity at a scanning point AS which forms an angle α with the graduation plane TE. As a result, the light beam LS is not reflected in an incidence plane perpendicular to the measuring axis X of the graduation plane TE. Instead, the reflected light beam LS forms an angle 2α with the incident light beam LS along the measuring axis X. The scanning graduation plane ATE is parallel to the graduation plane TE and is separated from the graduation plane TE by a scanning distance z. Thus, during the scanning of the graduation T at the scanning point AS by means of the scanning graduation AT, the true measuring value M is not obtained. Instead, an erroneous measuring value FM is obtained. The difference between the true measuring value M and the erroneous measuring value FM is the measuring error $F = M - FM = 2\alpha z$. As a numerical example, if at the scanning the true measuring value M from the zero point 0 is 10, and an erroneous measuring value $FM = 9$ is determined, then the measuring error F is $F = 10 - 9 = 1$.

Figure 4:
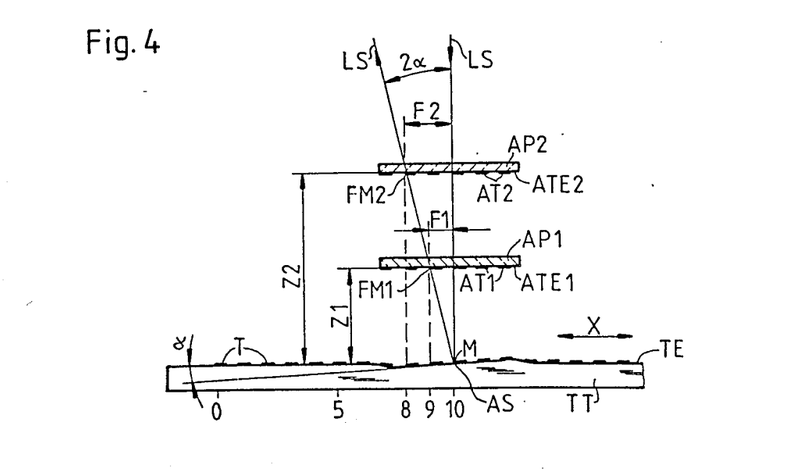
FIG. 4 is a second diagram of a light beam path.

A second schematic light beam path in a length measuring device is shown in FIG. 4 and illustrates how the measuring error F may be eliminated. A first scanning plate AP1 includes a first scanning graduation plane ATE1 having a first scanning graduation AT1. The first scanning graduation plane ATE1 is positioned a first scanning distance z1, in the direction of the light beam, from the graduation plane TE. A second scanning plate AP2 includes a second scanning graduation plane ATE2 having a second scanning graduation AT2. The second scanning graduation plane ATE2 is positioned a second scanning distance z2, in the direction of the light beam, from the graduation plane TE.

In the light beam path shown in FIG. 4 the light beam reflected at scanning point AS forms, with the incident light beam LS, the same angle 2α along the measuring axis X as that shown in FIG. 3. Thus, in the scanning of the graduation T at the scanning point AS, the true measuring value is not obtained. Instead, by means of the first scanning graduation AT1, a first erroneous measuring value FM1 is obtained, and, by means of the second scanning graduation AT2, a second erroneous measuring value FM2 is obtained. The difference between the true measuring value M and the first erroneous measuring value FM1 produces the first measuring error $F1 = M - FM1 = 2\alpha z1$. The difference between the true measuring value M and the second erroneous measuring value FM2 produces the second measuring error $F2 = M - FM2 = 2\alpha z2$.

The true measuring value M can now be mathematically determined from the first erroneous measuring value FM1 and the corresponding first scanning distance z1, as well as from the second erroneous measuring value FM2 and the corresponding second scanning distance z2. From the geometrical proportions of FIG. 4, it follows that:

$$F1/z1 = F2/z2 \quad F1 = F2 \cdot z1/z2 \tag{1}$$

$$M = FM1 + F1 = FM1 + F2 \cdot z1/z2$$

$$M = FM2 + F2 \quad F2 = M - FM2$$

$$M = FM1 + (M - FM2) \cdot z1/z2$$

$$M = FM1 + M \cdot z1/z2 - FM2 \cdot z1/z2$$

$$M(1 - z1/z2) = FM1 - FM2 \cdot z1/z2$$

$$M = (FM1 - FM2 \cdot z1/z2)/(1 - z1/z2)$$

For $z2 = 2z1$ it follows:

$$M = 2FM1 - FM2. \tag{2}$$

As an example, the true measuring value M from the zero point 0 to the scanning point AS is 10. If the first erroneous measuring value FM1 is 9, as determined by means of the first scanning graduation AT1, and, if by means of the second scanning graduation AT2, the second erroneous measuring value FM2 is determined to be 8, then the true measuring value $M = 2FM1 - FM2 = (2 \cdot 9) - 8 = 10$ results from equation (2), with $z2 = 2Z1$.

Figures 5A, 5B:
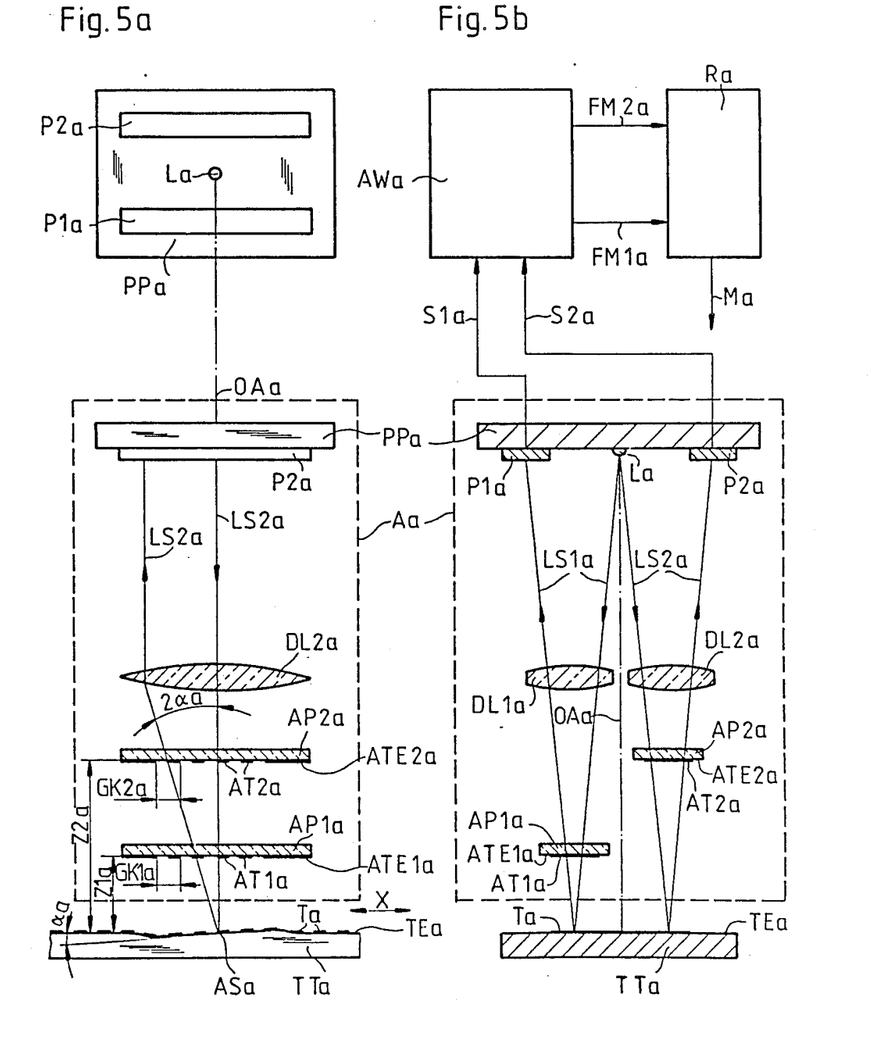

In FIGS. 5a and 5b, a first preferred embodiment of the invention is shown in which an incremental graduation Ta is scanned by light from a non-contacting scanning unit Aa in a graduation plane TEa of a metallic graduation support TTa. A first scanning plate AP1a includes a first scanning graduation plane ATE1a having a first scanning graduation AT1a. The first scanning graduation plane ATE1a is parallel to the graduation plane TEa and is positioned a first scanning distance z1a from the graduation plane TEa. A second scanning plate AP2a includes a second scanning graduation plane ATE2a having a second scanning graduation AT2a. The second scanning graduation plane ATE2a is parallel to the graduation plane TEa and is positioned a second scanning distance z2a from the graduation plane TEa. The scanning plates AP1a, AP2a are laterally displaced from one another in a direction perpendicular to the measuring axis X and are symmetrically positioned about the optical axis OAa of the beam path. A first decentered lens DL1a and a first photoelement P1a on a photoelement plate PPa are optically associated with the first scanning plate AP1a. A second decentered lens DL2a, and a second photoelement P2a on the photoelement plate PPa are optically associated with the second scanning plate AP2a. In FIG. 5a, the photoelement plate PPa is also shown in a view from below.

According to FIG. 5b, a light source La positioned on the photoelement plate PPa, in the optical axis OAa of the beam path, emits a first light beam LS1a which traverses the first decentered lens DL1a and the first scanning graduation plane ATE1a. The first beam LS1a is reflected from the graduation plane TEa back through the first scanning graduation plane ATE1a to the first decentered lens DL1a. The first beam is then directed onto the first photoelement P1a of the photoelement plate PPa. The light source La also emits a second light beam LS2a which traverses the scond decentered lens DL2a and the second scanning graduation plane ATE2a. This second beam LS2a is reflected from the graduation plane TEa back through the second scanning graduation plane ATE2a to the second decentered lens DL2a. The second beam LS2a is then directed onto the second photoelement P2a of the photoelement plate PPa. The first photoelement P1a produces a first periodic scanning signal S1a, and the second photoelement P2a produces a second periodic scanning signal S2a. In an evaluation device AWa, each of the periodic scanning signals S1a, S2a is conducted to a pulse-shaper stage and a connected counter. The shaper stages and connected counters form first and second erroneous measuring values FM1a, FM2a. These erroneous measuring values FM1a, FM2a are conducted to a computer Ra, which calculates a true measuring value Ma.

As shown in FIG. 5a, the graduation plane TEa has, at one scanning point ASa, an irregularity, which forms an angle α a with the graduation level TEa. As a result, the incident light beams LS1a, LS2a from the light source La are not reflected in an incidence plane perpendicular to the measuring axis X from the graduation plane TEa. Instead, the reflected light beams LS1a, LS2a form, with the incident light beams LS1a, LS2a, an angle of 2α along the measuring axis X. Thus, in the scanning of the graduation Ta at the scanning point ASa, the true measuring value Ma is not obtained. Instead, a first erroneous measuring value FM1a is obtained by means of the first scanning graduation AT1a and a second erroneous measuring value FM2a is obtained by means of the second scanning graduation AT2a. From the erroneous measuring values FM1a, FM2a, the computer Ra determines the true measuring value Ma by using equation (1) above.

If the first scanning distance z1a and the second scanning distance z2a have a proportion of z2a=2z1a, the true measuring value Ma can be calculated by the computer Ra from equation (2) above, since Ma=2F-M1a−FM2a. If the first grid constant GK1a of of the first scanning graduation AT1a and the second grid constant GK2a of the second scanning graduation AT2a have the proportion of GK2a=2GK1a, then equation (2) is simplified to equation (2a), Ma=F-M1a−FM2a. In this case, both counters in the evaluation device AWa are replaced by a differential counter, and the computer Ra can be eliminated.

Figure 6:
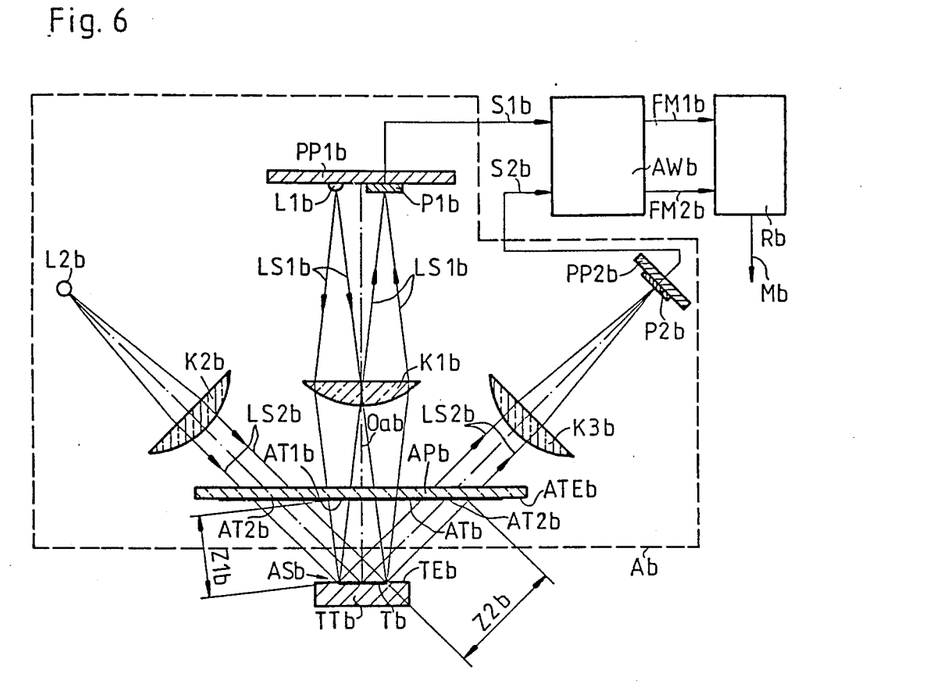
FIG. 6 is a cross-sectional representation of a second preferred embodiment of the invention.

A second preferred embodiment of the invention is shown in FIG. 6. An incremental graduation Tb in a graduation plane TEb of a metallic graduation support TTb is scanned by light from a non-contacting scanning unit Ab. A scanning plate APb includes a scanning graduation plane ATEb having a scanning graduation ATb. The scanning graduation plane ATEb is positioned parallel to the graduation plane TEb. A first condenser K1b and a first photoelement plate PP1b comprising a first light source L1b and a first photoelement P1b are optically associated with the scanning plate APb. The first light source L1b and the first photoelement P1b are positioned about the optical axis OAb of the beam path, in an incidence plane perpendicular to the measuring axis X. The first light beams LS1b emitted by the first light source L1b traverse the first condenser K1b and a first scanning graduation AT1b in the central area of the scanning graduation ATb of the scanning plate APb. The first light beams LS1b are reflected at the graduation plane TEb through the first scanning graduation AT1b and the first condenser K1b, to the first photoelement P1b. The graduation plane TEb is separated from the first scanning graduation AT1b, in the direction of the first light beams LS1b, by a first scanning distance z1b.

In an incidence plane perpendicular to the measuring axis X, a second light source L2b with a second condenser K2b is positioned to the left of the first light source L1b. The second light beams LS2b emitted by the second light source L2b traverse the second condenser K2b and a second scanning graduation AT2b in the left lateral area of the scanning graduation ATb of the scanning plate APb. The second light beams LS2b are reflected at the graduation plane TEb through a second scanning graduation AT2b in the right lateral area of the scanning graduation ATb, and a third condenser K3b, to a second photoelement P2b of a second photoelement plate PP2b. The graduation level TEb is separated from the second scanning graduations AT2b in both lateral areas of the scanning graduation ATb, in the direction of the second light beams LS2b, by a second scanning distance z2b. Periodic scanning signals S1b, S2b are produced by the photoelements P1b, P2b and are conducted to an evaluation device AWb. The evaluation device AWb produces erroneous measuring values FM1b, FM2b, which are conducted to a computer Rb, which determines the true measuring value Mb. The first scanning graduation AT1b and the second scanning graduations AT2b are identical.

The graduation plane TEb has an irregularity at a scanning point ASb, which forms an angle αb with the graduation plane TEb. As a result, the incident light beams LS1b, LS2b from the light sources L1b, L2b are not reflected in their incidence planes perpendicular to the measuring axis X. Instead, the reflected light beams LS1b, LS2b form, with the incident light beams LS1b, LS2b, an angle 2αb along the measuring axis X (analogous to the 2αa of FIG. 5a). Thus, in the scanning of the graduation Tb at the scanning point ASb the true measuring value Mb is not obtained. Instead, by means of the first scanning graduation AT1b, a first erroneous measuring value FM1b is obtained, and, by means of the second scanning graduation AT2b, a second erroneous measuring value FM2b is obtained. From the erroneous measuring values FM1b, FM2b, the computer Rb determines the true measuring value Mb from equation (1) above.

If the first scanning distance z1b and the second scanning distance z2b have a proportion of z2b= 2z1b, the true measuring value Mb can be calculated by the computer from equation (2), Mb=2FM1b−FM2b.

Figure 7:
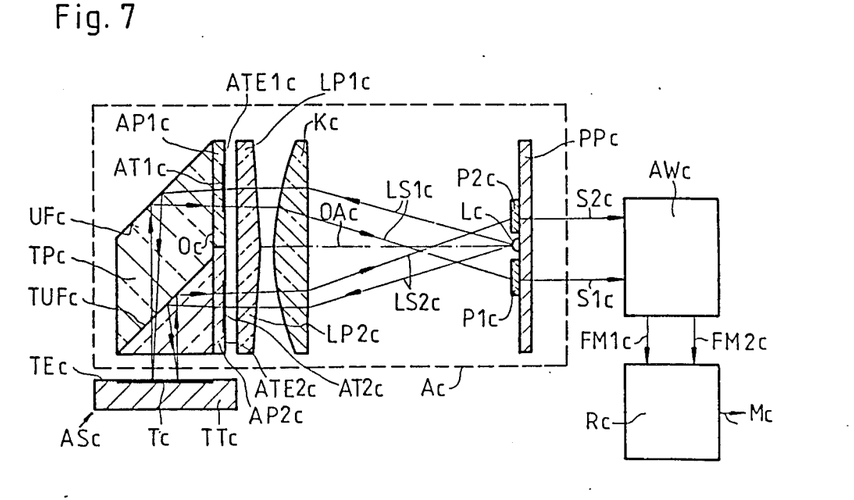
FIG. 7 is a cross-sectional representation of a third preferred embodiment of the invention.

In FIG. 7, a third preferred embodiment of the invention is shown in which an incremental graduation Tc in a graduation plane TEc of a metallic graduation support TTc is scanned by light from a noncontacting scanning unit Ac. A first scanning plate AP1c with a first scanning graduation AT1c is positioned, perpendicular to the graduation plane TEc, in a first scanning graduation plane ATE1c. A second scanning plate AP2c with a second scanning graduation AT2c is positioned, perpendicular to the graduation plane TEc, in a second scanning plane ATE2c. The scanning plates AP1c, AP2c are attached on a surface Oc of a separator deviation prism TPc next to one another along an axis parallel to the measuring axis X. Optically associated with the first scanning plate AP1c are a first deviation prism LP1c and a first photoelement P1c located on a photoelement plate PPc. A second deviation prism LP2c and a second photoelement P2c located on the photoelement plate PPc are optically associated with the second scanning plate AP2c. The first deviation prism LP1c and the first photoelement P1c are symmetrical about the optical axis of the beam path OAc with the second deviation prism LP2c and the second photoelement P2c, respectively. From a light source Lc positioned on the photoelement plate PPc, on the optical axis OAc, a first light beam LS1c traverses a condenser Kc, the first deviation prism LP1c, and the first scanning graduation plane ATE1c. The first light beam LS1c is deflected from a deviation surface UFc of the separator deviation prism TPc, through a separator deviation surface TUFc, to the graduation plane TEc. The graduation plane TEc reflects the first light beam LS1c through the separator deviation surface TUFc, the deviation surface UFc, the first scanning graduation plane ATE1c, the first deviation prism LP1c and the condenser Kc, to the first photoelement P1c. From the light source Lc, a second light beam LS2c traverses the condenser Kc, the second deviation prism LP2c and the second scanning graduation plane ATE2c, and is deflected by the separator deviation surface TUFc to the graduation plan TEc. The graduation plane TEc reflects the second light beam LS2c through the separator deviation surface TUFc, the second scanning graduation plane ATE2c, and the condenser Kc, to the second photoelement P2c. The graduation plane TEc is separated from the first scanning graduation AT1c, in the direction of the first light beam LS1c, by a first scanning distance z1c. The graduation plane TEc is separated from the second scanning graduation plane ATE2c, in the direction of the second light beam LS2c, by a second scanning distance z2c. Effectively, the first scanning distance z1c, not shown, is the sum of the optical path of the first light beam LS1c from the graduation plane TEc to the deviation surface UFc and the optical path of the first light beam LS1c from the deviation surface UFc up to the first scanning graduation plane ATE1c, with consideration to the corresponding refractive index. Effectively, the second scanning distance z2c, not shown, is the sum of the optical path of the second light beam LS2c from the graduation plane TEc to the separator deviation surface TUFc to the second scanning graduation plane ATE2c, with consideration to the corresponding refractive index.

Periodic scanning signals S1c, S2c are produced by the photoelements P1c, P2c and are conducted to an evaluation device AWc. The evaluation device AWc produces erroneous measuring values FM1c, FM2c, which are conducted to a computer Rc, which determines the true measuring value Mc.

The graduation plane TEc has an irregularity at a scanning point ASc, which forms with the graduation plane TEc an angle $\alpha c$, not shown. As a consequence, the incident light beams LS1c, LS2c are not reflected in their incidence planes perpendicular to the measuring axis X. Instead, the reflected light beams LS1c, LS2c form, with the incident light beams LS1c, LS2c, an angle $2\alpha c$ along the measuring axis X (analogous to the angle $2\alpha a$ of FIG. 5a). Thus, during the scanning of the graduation Tc at the scanning point ASc, the true measuring value Mc is not obtained. Instead, a first erroneous measuring value FM1c is obtained by means of the first scanning graduation AT1c, and, by means of a second scanning graduation AT2c, a second erroneous measuring value FM2c is obtained. From the erroneous measuring values FM1c, FM2c, the computer Rc determines the true measuring value Mc by using equation (1) above.

If the first scanning distance z1c and the second scanning distance z2c have a proportion of z2c=2z1c, then the true measuring value Mc can be calculated by the computer Rc from equation (2), Mc=2FM1c−FM2c. If the first grid constant GK1c of the first scanning graduation AT1c and the second grid constant GK2c of the second scanning graduation AT2c have the proportion of GK2c=2GK1c, then equation (2) simplifies to equation (2a), Mc=FM1c−FM2c. In this case, both counters in the evaluation device AWc are replaced by a differential counter, and the computer RC can be eliminated.

Such types of erroneous measuring values appear, for example, due to local irregularities of the graduation plane of the graduation support, deformations of the graduation plane by the attachment of the graduation support to an irregular attachment surface on the object to be measured, or by tilting of the graduation support through guidance errors in the guide unit of the object to be measured. These erroneous measuring values can also arise with an angle measuring device that uses a cylindrical graduation. In such a device the graduation is located on an external or internal surface of, for example, a hollow cylinder. If the graduation surface with this cylindrical graduation has deviations from the cylindrical form, then erroneous measuring values will appear.

The invention can be successfully employed in photoelectric incremental, as well as absolute, length or angle measuring devices.

Of course, it should be understood that a wide range of changes and modifications can be made to the preferred embodiments described above. It is therefore intended that the foregoing detailed description be regarded as illustrative rather than limiting, and that it be understood that it is the following claims including all equivalents which are intended to define the scope of this invention.

I claim:

1. A photoelectric measuring device for measuring the relative position of a first object and a second object comprising:
   a graduation support connected to said first object;
   a graduation located on said graduation support; and
   a scanning unit, connected with said second object, for scanning said graduation, said scanning unit comprising a light source emitting a light beam in a light beam direction, and at least two scanning graduations positioned at different scanning distances from said graduation and displaced laterally from one another in a direction perpendicular to said light beam direction, such that each of said scanning graduations is used to produce a distinct measuring value from the other and from which two distinct measuring values a true measuring value may be determined.

2. The measuring device of claim 1 further comprising:
   a first scanning plate including a first of said scanning graduations and defining a first scanning graduation plane;
   a second scanning plate including a second of said scanning graduations and defining a second scanning graduati plane;
   a first decentered lens and a first photoelement optically associated with said first scanning graduation;
   a second decentered lens and a second photoelement optically associated with said second scanning graduation and located symmetrically about an optical axis with said first decentered lens and said first photoelement, respectively;
   a light source positioned along said optical axis;
   and wherein:
   said graduation support defines a graduation plane;
   said first scanning graduation plane is located parallel to said graduation plane;
   said second scanning graduation plane is located parallel to said graduation plane;
   a first of said scanning distances is defined from said graduation plane to said first scanning graduation plane along a first axis perpendicular to a measuring axis parallel to a direction of measurement; and
   a second of said scanning distances is defined from said graduation plane to said second scanning graduation plane along a second axis perpendicular to said measuring axis.

3. The measuring device of claim 1 wherein:
said graduation support defines a graduation plane;
a first of said scanning graduations is symmetrical about an optical axis defined perpendicular to a measuring axis which is parallel to a direction of measurement;
a second of said scanning graduations is symmetrical about said optical axis with a third of said scanning graduations;
and further comprising:
  a scanning plate including said first, second, and third scanning graduations and defining a scanning graduation plane located parallel to said graduation plane;
  a first light source which emits a first light beam, a first condenser, and a first photoelement, each optically associated with said first scanning graduation;
  a second light source which emits a second light beam and a second condenser, both optically associated with said second scanning graduation;
  a third condenser and a second photoelement, both optically associated with said third scanning graduation; and wherein:
  a first of said scanning distances is defined from said graduation plane to said first scanning graduation plane along a light beam path defined by said first light beam; and
  a second of said scanning distances is defined from said graduation plane to said second scanning graduation plane along a light beam path defined by said second light beam.

4. The measuring device of claim 1 wherein:
said graduation support defines a graduation plane;
and further comprising:
  a first scanning plate including a first of said scanning graduations and defining a first scanning graduation plane located perpendicular to said graduation;
  a second scanning plate including a second of said scanning graduations and defining a second scanning graduation plane located perpendicular to said graduation plane, such that said first and second scanning graduation planes are symmetrical about an optical axis that runs both perpendicular to a measuring axis parallel to a direction of measurement, and parallel to said graduation plane;
  a first deviation prism and a first photoelement optically associated with said first scanning graduation;
  a second deviation prism and a second photoelement optically associated with said second scanning graduation;
  a separating deviation prism associated with said scanning plates;
  a light source which emits first and second light beams and is positioned along said optical axis; and wherein:
  a first of said scanning distances is defined from said graduation to said first scanning graduation plane along a light beam path defined by said first light beam; and
  a second of said scanning distances is defined from said graduation to said first scanning graduation plane along a light beam path defined by said second light beam.

5. The measuring device of claim 1 wherein said true measuring value can be determined from said measuring values by the equation:

$$M = (FM1 - z1/z2)/(1 - z1/z2)$$

wherein M represents said true measuring value, z1 represents a first of said scanning distances from said graduation to a first of said scanning graduations, z2 represents a second of said scanning distances from said graduation to a second of said scanning graduations and z2 is greater than z1, FM1 represents a first of said measuring values produced by means of said first scanning graduation, and FM2 represents a second of said measuring values produced by means of said second scanning graduation.

6. The measuring device of claim 1 wherein a second of said scanning distances from said graduation to a second of said scanning graduations is equal to twice a first of said scanning distances from said graduation to a first of said scanning graduations, such that said true measuring value can be determined from said measuring values by the equation:

$$M = 2 \cdot FM1 - FM2$$

wherein M represents said true measuring value, FM1 represents a first of said measuring values produced by means of said first scanning graduation, and FM2 represents a second of said measuring values produced by means of said second scanning graduation.

7. The measuring device of claim 5 wherein said second scanning distance is equal to twice said first scanning distance, such that said true measuring value can be determined from said measuring values by the equation:

$$M = 2 \cdot FM1 - FM2$$

wherein M represents said true measuring value, FM1 represents said first measuring value, and FM2 represents said second measuring value.

8. The measuring device of claim 1 wherein a second of said scanning distances from said graduation to a second of said scanning graduations is equal to twice a first of said scanning distances from said graduation to a first of said scanning graduations and a grid constant defined by said second scanning graduation is equal to twice a grid constant defined by said first scanning graduation, such that said true measuring value can be determined from said measuring values by the equation:

$$M = FM1 - FM2$$

wherein M represents said true measuring value, FM1 represents a first of said measuring values produced by means of said first scanning graduation, and FM2 represents a second of said measuring values produced by means of said second scanning graduation.

9. The measuring device of claim 5 wherein said second scanning distance is equal to twice said first scanning distance and a grid constant defined by said second scanning graduation is equal to twice a grid constant defined by said first scanning graduation, such that said true measuring value can be determined from said measuring values by the equation:

$$M = FM1 - FM2$$

wherein M represents said true measuring value, FM1 represents said first measuring value, and FM2 represents said second measuring value.

10. The measuring device of claim 5 wherein a computer is used to determine said true measuring value from said measuring values.

11. The measuring device of claim 6 wherein a computer is used to determine said true measuring value from said measuring values.

12. The measuring device of claim 7 wherein a computer is used to determine said true measuring value from said measuring values.

13. The measuring device of claim 8 wherein a differential counter is used to determine said true measuring value from said measuring values.

14. The measuring device of claim 9 wherein a differential counter is used to determine said true measuring value from said measuring valus.

15. A photoelectric measuring device for measuring the relative position of a first object and a second object comprising:
- a graduation support connected to said first object;
- a graduation located on said graduation support;
- a scanning unit, connected to said second object, for scanning said graduation, said scanning unit comprising:
- a light source emitting a light beam in a light beam direction;
- first and second scanning graduations, positioned at first and second scanning distances from said graduation and displaced laterally from one another in a direction perpendicular to said light beam direction;
- means for producing a first and a second distinct measuring value based on light passing through said first and second scanning graduations, respectively; and
- means for producing a true measuring value based on said first and second measuring values.

16. The device of claim 15 further comprising first and second scanning plates; and wherein:
- said graduation support defines a graduation plane;
- said first scanning plate defines a first scanning graduation plane;
- said second scanning plate defines a second scanning graduation plane; and
- said first and second scanning graduation planes are parallel to said graduation plane.

17. The device of claim 15 wherein said graduation support defines a graduation plane; and further comprising:
- a third scanning graduation; and
- a scanning plate including said first, second and third scanning graduations and defining a scanning graduation plane located parallel to said graduation plane.

18. The device of claim 15 wherein said graduation support defines a graduation plane; and further comprising:
- a first scanning plate including said first scanning graduation and defining a first scanning graduation plane located perpendicular to said graduation plane; and
- a second scanning plate including said second scanning graduation and defining a second scanning graduation plane located perpendicular to said graduation plane.

19. A photoelectric measuring device for measuring the relative position of a first object and a second object comprising:
- a graduation support connected to said first object;
- a graduation located on said graduation support; and
- a scanning unit, connected with said second object, for scanning said graduation, said scanning unit comprising at least two scanning graduations positioned at different scanning distances from said graduation, such that said scanning graduations are used to produce measuring values from which a true measuring value may be determined from said measuring values by the equation:

$$M = (FM1 - FM2 \cdot z1/z2)/(1 - z1/z2)$$

wherein M represents said true measuring value, z1 represents a first of said scanning distances from said graduation to a first of said scanning graduations, z2 represents a second of said scanning distances from said graduation to a second of said scanning graduations and z2 is greater than z1, FM1 represents a first of said measuring values produced by means of said first scanning graduation, and FM2 represents a second of said measuring values produced by means of said second scanning graduation.

* * * * *